US006263420B1

(12) United States Patent
Tan et al.

(10) Patent No.: US 6,263,420 B1
(45) Date of Patent: Jul. 17, 2001

(54) DIGITAL SIGNAL PROCESSOR PARTICULARLY SUITED FOR DECODING DIGITAL AUDIO

(75) Inventors: Yew-Koon Tan, San Jose, CA (US); Agee Ozeki; Tetsuya Fukushima, both of Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/115,187

(22) Filed: Jul. 14, 1998

Related U.S. Application Data
(60) Provisional application No. 60/060,710, filed on Sep. 17, 1997.

(51) Int. Cl.[7] .................................................. G06F 9/00
(52) U.S. Cl. ........................ 712/42; 712/36; 712/32; 712/42; 712/220; 708/209; 708/490; 708/497
(58) Field of Search .................................. 712/32, 35, 36, 712/42, 220–224, 232; 710/68, 111, 1; 708/209–495

(56) References Cited

U.S. PATENT DOCUMENTS

| | | | |
|---|---|---|---|
| 3,522,589 | 8/1970 | Thron et al. ...................... | 340/172.5 |
| 3,614,746 | 10/1971 | Klinkhamer ...................... | 342/172.5 |
| 4,467,444 | * 8/1984 | Harmon, Jr. et al. ................. | 712/42 |
| 5,173,695 | * 12/1992 | Sun et al. ................................ | 341/67 |
| 5,276,634 | * 1/1994 | Suzuki et al. ......................... | 708/495 |
| 5,719,998 | * 2/1998 | Ku et al. .............................. | 710/111 |
| 5,881,275 | * 3/1999 | Peleg et al. .......................... | 712/223 |
| 5,978,822 | * 11/1999 | Muwafi et al. ...................... | 708/209 |

FOREIGN PATENT DOCUMENTS

| | | |
|---|---|---|
| 195 24 863 A1 | 1/1996 | (DE) . |
| 0 718 757 A2 | 6/1996 | (EP) .............................. G06F/9/302 |
| WO96/17291 | 6/1996 | (WO) . |

OTHER PUBLICATIONS

Teiji, Nishizawa, *Register Control Circuit*, Matsushita Electric Ind Co Ltd, Patent Abstracts of Japan, Pub. No. 59057339, Apr. 2, 1984; App. No. 57169139, Sep. 27, 1981.
IBM Corp., Fast Method for Generating Effective Addresses, IBM Technical Disclosure Bulletin, vol. 36, No. 11, 11/93 pp. 505–507.

* cited by examiner

*Primary Examiner*—Meng-Al T. An
*Assistant Examiner*—Wen-Tai Lin
(74) *Attorney, Agent, or Firm*—Wood, Herron&Evans, L.L.P.

(57) ABSTRACT

A digital signal processor particularly adapted for decoding digital audio. The barrel shifter of the processor includes logical circuitry, so that operations involving a combination of a logical operation and a shift, can be performed in a single pass through the combined barrel shifter/logical unit, rather than requiring separate passes through the barrel shifter and ALU, which would require more instruction cycles. The address generator of the processor, includes circuitry which concatenates the most significant bits of a base address of a table to the least significant bits of an index, to thereby rapidly generate addresses of indexed locations in a table.

5 Claims, 8 Drawing Sheets

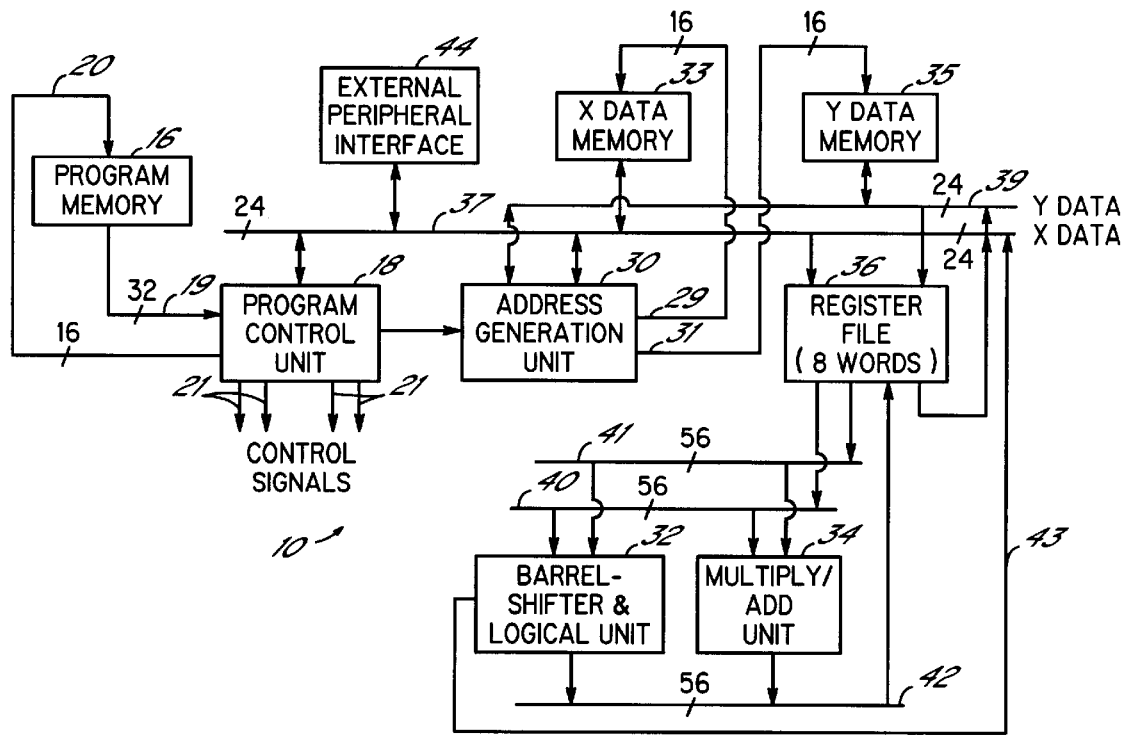
FIG. 1
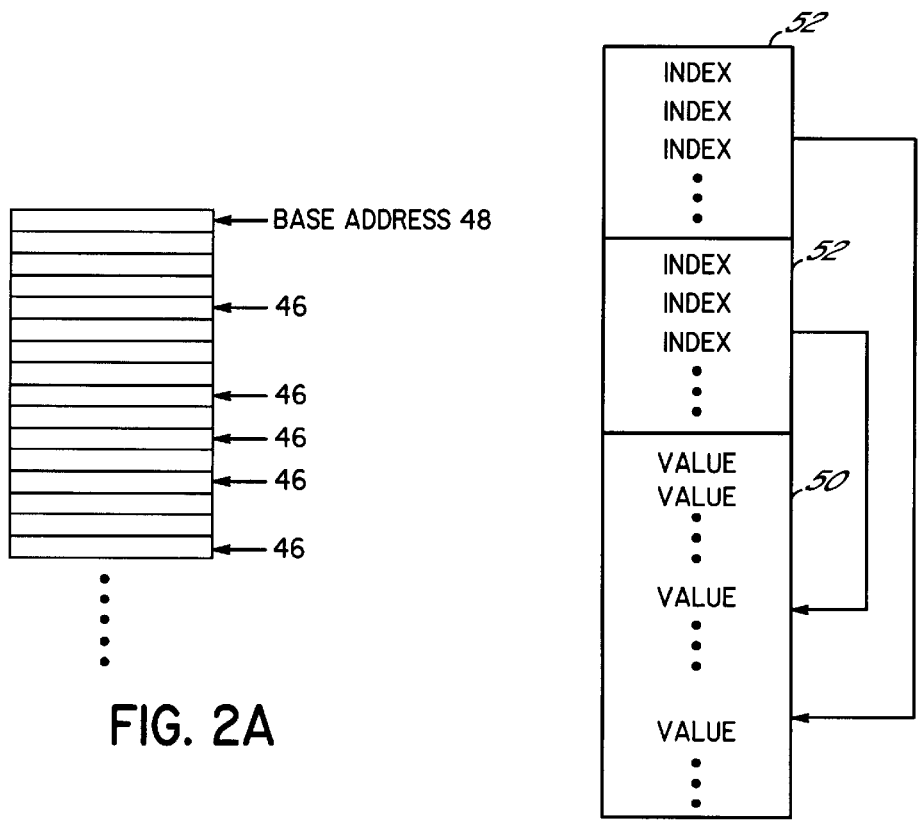
FIG. 2A
FIG. 2B

DIGITAL SIGNAL PROCESSOR PARTICULARLY SUITED FOR DECODING DIGITAL AUDIO

CROSS-REFERENCE TO RELATED APPLICATION

This application claims priority under 35 U.S.C. 119(e) to provisional U.S. patent application No. 60/060,710, filed Sep. 17, 1997 which is hereby incorporated by reference herein in its entirety.

FIELD OF THE INVENTION

The present invention relates to digital signal processing and particularly to processing circuits for processing digital signals.

BACKGROUND OF THE INVENTION

A typical general purpose digital signal processor (DSP) includes a controller which decodes instructions, by controlling operations of a high speed data path, registers, and a memory address generator. Individual instructions are fetched to the controller, typically at the rate of one instruction per clock cycle (or slower), and the controller decodes each instruction and sends control signals to the data path, registers, and memory address generator to perform the actions required by the instruction. Through programmed combinations of instructions, any variety of data processing operations can be accomplished.

The high speed data path of a DSP typically includes a number of registers for storing data being processed, an arithmetic and logic unit (ALU) for performing logical (e.g., AND, OR, XOR) operations as well as arithmetic (addition, multiplication, division) operations, and a parallel-connected bit shifting unit for performing bit shifting and masking. The memory address generator, in response to the controller, generates memory addresses for retrieving data from a main memory for delivery to the DSP, or for storing data produced by the DSP. Often, the memory address generator must produce sequential addresses or addresses identifying equally spaced locations in memory, to achieve a desired pattern of information retrieval and storage.

Each DSP (or other microprocessor) is associated with a finite, well-defined set of instructions, which instructions are arranged into programs to operate the DSP. To provide an example, a typical DSP instruction identifies an operation to be performed by either the ALU or bit shifting unit, identifies source register(s) in the DSP containing values on which the operation is to be performed, and identifies destination register(s) where the results of the operation are to be stored. In some cases the instruction may incorporate binary data to be used as one operand for the instruction, in which case the binary data incorporated in the instruction is delivered to the data path and combined with data stored in the registers by the ALU or bit shifting unit.

A typical calculation might be performed as follows: The memory address generator obtains values from main memory for processing. Once retrieved, the ALU performs a numeric operation on the values, and the results are fed back into registers. The results in the registers are then fed into the bit shifting and masking unit during a next instruction cycle. Finally, the memory address generator causes the processed values to be stored back in the main memory.

SUMMARY OF THE INVENTION

In accordance with principles of the present invention, a DSP is provided with processing circuitry particularly adapted for decoding digital audio. Specifically, a barrel shifter is enhanced to perform the logical operations typically performed in an ALU, so that operations involving a combination of a logical operation and a shift, can be performed in a single pass through the combined barrel shifter/logical unit, rather than requiring separate passes through the barrel shifter and ALU, which would require more instruction cycles.

One particular operation which combines a logical operation and shift, is a cyclic redundancy check. Another particular operation is the unpacking of a bit stream. Both operations are often used in digital signal decoding, and particular instructions for facilitating these operations are described.

In accordance with another aspect, the DSP is improved by reducing the number of instruction cycles needed for the memory generation unit to generate an address within a table, using an index and base address. Specifically, the address generator concatenates the most significant bits of the base address of a table to the least significant bits of the index into the table.

In specific disclosed embodiments, the address generator unit includes an adder for incrementing or decrementing the index in response to instructions. Further, the address generator includes a limiter coupled to the output of the adder for preventing the index from being incremented to a value greater than the length of the table, or decremented to a value below zero.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a schematic block diagram of a DSP in accordance with principles of the present invention;

FIG. 2A is an illustration of a table in memory and a sequence of memory locations in the table accessed by a DSP routine, and FIG. 2B is an illustration of a multi-layer set of tables in memory and indexes and values in memory locations in the table accessed by a DSP routine;

DETAILED DESCRIPTION OF SPECIFIC EMBODIMENTS

Figure 3A:
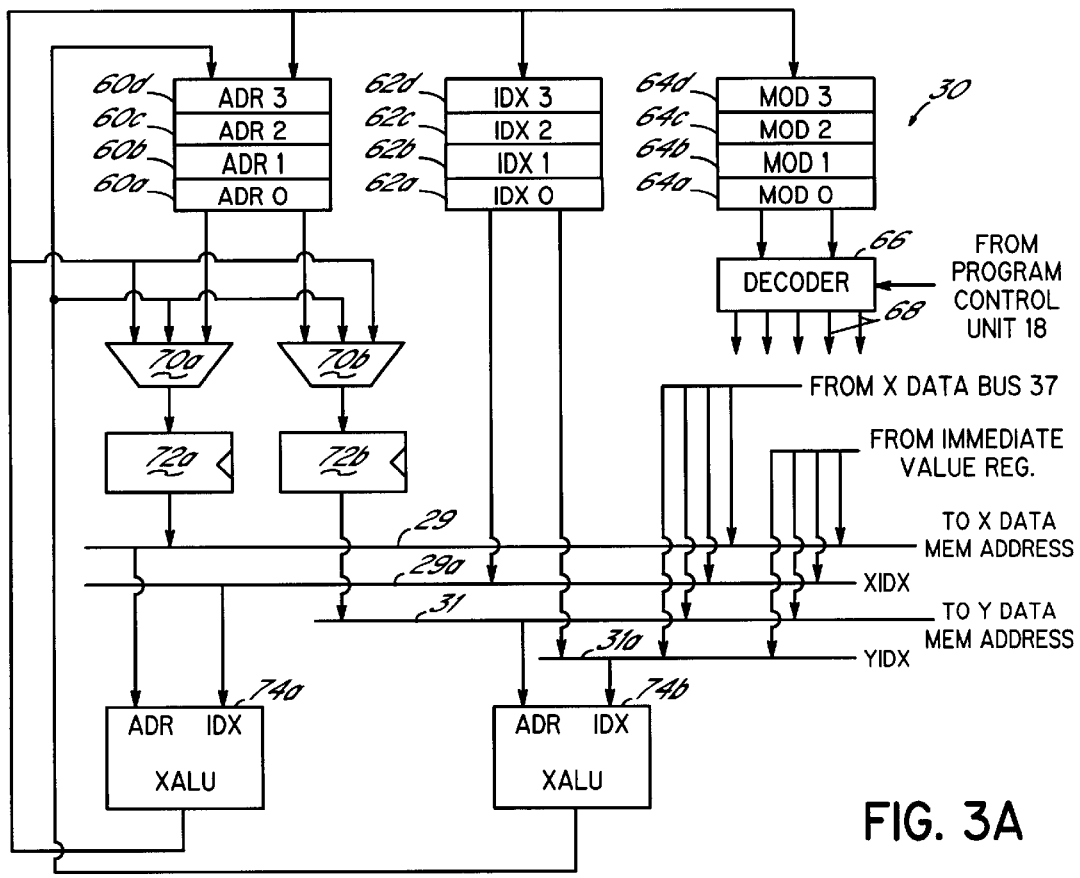
FIG. 3A is a schematic block diagram of the memory address generator of FIG. 1.

Referring to FIG. 1, a digital signal processor 10 in accordance with the principles of the present invention includes various functional units which support instructions that can be executed by the processor. Processor 10 responds to a program of instructions stored in program memory 16.

Processor 10 includes a program control unit 18 which fetches instructions from program memory 16 through a bus 19, and then decodes these instructions, causing other functional units in processor 10 to perform the instructed operations. Program control unit 18 fetches instructions from program memory 16 by delivering an address over bus 20 to program memory 16. Program control unit 18 may fetch sequential instructions in program memory 16, or may decode and execute various JUMP or CALL commands to sequence from one section of program memory 16 to another section under control of instructions in program memory 16.

In response to each instruction fetched by program control unit 18, control unit 18 produces control signals on lines 21 which are delivered to other functional units of processor 10 causing those functional units to perform the instructed operations.

The functional units in processor 10 include an address generation unit 30 for responding to control signals and/or data from a X-data bus 37, and generating memory addresses on busses 29 and 31. The memory addresses on busses 29 and 31 are delivered to X and Y data memories 33 and 35. The output of X data memory 33 is delivered to bus 37 and the output of Y data memory 35 is delivered to bus 39.

Processor 10 includes a barrel shift and logical unit 32, which performs logical operations such as AND, OR and exclusive OR (XOR) as well performing shift operations on binary data. In addition to barrel shift and logical unit 32, processor 10 includes a multiply/add unit 34 which performs multiplication and addition operations on binary values received therein.

Units 32 and 34 respond to data found in registers of a register file 36. General purpose registers in register file 36 can be accessed by units 32 and 34 to perform computations as instructed by instructions received at program control unit 18. The contents of registers in register file 36 can be retrieved via busses 40 or 41 by units 32 or 34. The outputs of units 32 and 34 are delivered to a bus 42, and can be stored into registers in register file 36 from bus 42. Furthermore, as discussed below, barrel-shifter and logical unit 32 includes an adder, the output of which is used within barrel-shifter and logical unit in controlling its operations. Furthermore, the output of this adder is delivered to bus 37 over line 43.

Data from register file 36 can also be delivered to busses 37 or 39, to permit storage of data in data memories 33 and 35, or output of data to other areas via peripheral interface 44.

Referring now to FIGS. 2A, 2B, 3A and 3B, details of the operation of the address generator unit 30 of the processor 10 can be more clearly understood. As seen in FIG. 2A, a typical operation of a digital signal processor may involve repeated access to memory locations 46 in a data table or another similar data structure. Programs which access a table of this kind, typically define addresses in the table by reference to a base address 48 which marks the beginning of the table in main memory, and an index which identifies an offset from the base address to a particular accessed location 46 in the table. Typically a line in a source program requiring retrieval of a location in the table, will refer to an index into the table, leaving to the processor the task of converting the index to a memory address by adding the index to the previously defined base address 48. Often, as shown in FIG. 2A, the memory locations in the table accessed by software are randomly distributed in the table as opposed to being distributed in a particular pattern.

FIG. 2B illustrates a more complex table lookup operation that is used in some DSP computations. In this operation, the memory includes a large table 50 of values, and a plurality of index tables 52 containing indeces of locations in the large table 50. In a multi-level lookup table of this kind, a program calculation causes the program to select from among the index tables 52, and retrieve an index from the selected index table 52. The retrieved index is then used to select an entry in the large table 50 containing the desired value. A multi-level lookup table of this kind may be used in various data compression and encoding schemes such as Huffman coding.

One difficulty with memory accesses defined in terms of base address and in index, is the number of processing cycles required to convert the index into a memory address. Specifically, it is necessary for the processor to retrieve the base address into one register, retrieve the index into a second register, add the index and base address together (typically using the long adder in the processor's arithmetic/logic unit (ALU)), and place the result into a register where it can be used to generate a memory address request through an address generator unit.

In accordance with the principles of the present invention, address generator unit 30 includes hardware for performing index lookup of this kind without requiring the use of the functional units such as the ALU of the processor. Specifically, the assembly language for programming processor 10 requires that tables have a number of memory locations which is an even power of two, i.e., tables must have a length $2^n$, where n is a positive integer. Furthermore, tables must be located in memory so that a table of $2^n$ memory locations has a base address which is an even multiple of $2^n$.

The result of these constraints is that a memory address for a location in a table can be generated by concatenating the bits of the base address to bits of the index, without performing any addition or other numerical operations. Accordingly, as seen in FIG. 3A, address generator unit 30 comprises a plurality of registers 60a–60d into which the current address in a table being accessed is stored. Registers 60 are 16-bit registers into which 16-bit addresses are stored. Address generator unit 30 further comprises four 16-bit index registers 62a–62d. Registers 62 are 16-bit registers which store values for indexes which can be used in combination with the more significant bits of an address in an address register 60 to form a memory address. Finally, address generator unit 30 further comprises four 16-bit mode registers 64a–64d. Registers 64 are 16-bit registers which store values identifying a mode of operation of address generator unit 30, including, for some addressing modes, a table size.

The address, index and mode registers 60, 62 and 64 are used in groups of three to control the operation of address generator unit 30. That is, address register 60a is used in conjunction with index register 62a and mode register 64a.

Address register 60b is used in conjunction with index register 62b and mode register 64b. Similarly, registers 60c, 62c and 64c are used together, and registers 60d, 62d and 64d are used together. The manner of use of these registers is discussed in further detail below.

The operations of address generator unit 30 are controlled by a decoder 66, which is responsive to signals from program control unit 18 and generates control signals on lines 68 leading to other functional units of address generator unit 30. Decoder 66 responds to decoded control signals from program control unit 18 indicating an address generation mode to be used by address generator 30 in delivering an address over lines 29 to the XDATA memory 33, and an address generation mode to be used by address generator 30 in delivering an address over lines 31 to YDATA memory 35. Decoder 66 further receives the contents of up to two of the mode registers 64, and uses and/or forwards the contents of these registers to determine the addressing mode.

Address registers 60 are connected to multiplexers 70a and 70b. In any instruction cycle, the contents of up to two of address registers 60 are delivered to multiplexers 70a and 70b, as controlled by decoder 66 responding to program control unit 18 and the instruction being processed by processor 10. Multiplexers 70a and 70b deliver an output to latches 72a and 72b, respectively. The outputs of latches 72a and 72b are delivered to XDATA memory address lines 29 and YDATA memory address lines 31. The data on memory address lines 29 and 31 are also delivered to the Address inputs of two arithmetic/logical units XALU 74a and YALU 74b.

Index registers 62 are connected to XIDX and YIDX busses 29a and 31a. In any instruction cycle, the contents of up to two of index registers 62 are delivered to the XIDX and YIDX busses 29a and 31a, as controlled by decoder 66 responding to program control unit 18 and the instruction being processed by processor 10. The data on the XIDX and YIDX busses 29a and 31a are delivered to the Index inputs of the two arithmetic/logical units XALU 74a and YALU 74b.

XALU 74a and YALU 74b operate upon the data provided at their Address and Index inputs, in response to control signals from decoder 66, to appropriately increment, decrement, or perform special addressing modes in response to a current address and an index. The output of XALU 74a is delivered and can be stored in any address register 60, index register 62, or mode register 64. The output of YALU 74b is delivered to and can be stored in any address register 60. The outputs of XALU 74a and YALU 74b are also delivered to multiplexers 70a and 70b, so that multiplexers 70a and 70b may bypass these results directly into latches 72a and 72b under control of decoder 66.

The instruction set of the processor 10 illustrated in FIG. 1, includes various instructions which cause address incrementing, address decrementing, or special addressing modes. For each addressing mode, the contents of an address register, and its corresponding index register and mode register 60, 62 and 64, are utilized in determining the addressing mode and producing the resulting address. If the instruction invokes a special addressing mode, the mode register 64 is utilized to determine the particular mode and also to control the operations performed under that mode.

Address generation is typically invoked as part of a data retrieval. For example, an instruction including $$d4=x[adr2++]$$

retrieves into register d4 of register file 36, the contents of the XDATA memory 33 at the memory location identified by the address stored in the address register adr2. Thus, in response to this instruction, decoder 66 controls address register 60c, multiplexer 70a and latch 72a to deliver the contents of address register adr2 60c to XDATA memory address bus 29. In addition, because the instruction identifies the "++" addressing mode, the address stored in address register adr2 are incremented by 1 as part of executing the instruction. Thus, in further response to this instruction, decoder 66 controls XALU 74a to increment the address received at its Address input by one, and controls address register adr2 60c to store the resulting output from XALU 74a.

As is conventional in digital signal processing, instructions executed by processor 10 may identify multiple operations to be performed in parallel, e.g., a complete instruction may identify two memory fetch operations as well as processing to be performed by barrel-shifter and logical unit 32 and multiply/add unit 34. E.g., a typical complete instruction would be $$d0=d3*d2 \| d4=x[adr2\%] \| d5=y[adr3++]$$

In response to this instruction (1.) register d0 of register file 36 receives the product of the contents of registers d3 and d2 of register file 36 (via multiply/add unit 34), (2) register d4 of register file 36 is loaded with the contents of a memory location in a table in XDATA memory 33 at an address determined from address register adr2 60c, after which index register 62c and mode register 64c are combined to form a new address using a table lookup address mode described below, and address register adr2 60c is loaded with this new address, and (3) register d5 of register file 36 is loaded with the contents of a memory location in YDATA memory 35 at an address determined from address register adr3 60d, after which address register adr3 60d is incremented by one.

The following table identifies the normal addressing modes that are supported by the circuitry of FIG. 3, and the syntax used to identify those modes. It will be noted that data may be retrieved from the XDATA memory 33 or YDATA memory 35 using any one of these addressing modes, as indicated in the instruction syntax by identifying the memory "x" or "y" prior to the brackets (see the above examples). Within the brackets, the instruction syntax identifies the number n, n∈{0,1,2,3} of the address register adrn 60 and corresponding index and mode registers idxn 62 and modn 64 to be used. Furthermore, within the brackets the syntax symbolically identifies the particular addressing mode to be used.

| Syntax | Name | Description |
| --- | --- | --- |
| [adrn] | (no operation) | MEM address = <adrn> |
| [adrn++] | post-increment | MEM address = <adrn><br>adrn = adrn + 1 |
| [adrn--] | post-decrement | MEM address = <adrn><br>adrn = adrn - 1 |
| [adrn%] | Special mode | See below |
| [adrn+=imm5] | immediate post-increment | MEM address = <adrn><br>adrn = adrn + 5-bit immediate value encoded in instruction |
| [adrn-=imm5] | immediate post-decrement | MEM address = <adrn><br>adrn = adrn - 5-bit immediate value encoded in instruction |
| [imm16] | immediate indirect | MEM address = 16-bit immediate value encoded in instruction |

When an instruction identifies a special addressing mode by the syntax [adrn%], the specific special addressing mode to be used is determined by bits 14, 13 and 12 of mode register modn 64. The special addressing modes are identified in the following table:

| Syntax | modn bit 14-12 | Name | Description |
|---|---|---|---|
| [adrn%] | 000 | double-post-increment | MEM address = <adrn><br>adrn = adrn + 2 |
| [adrn%] | 001 | double-post-decrement | MEM address = <adrn><br>adrn = adrn − 2 |
| [adrn%] | 010 | plus index | MEM address = <adrn><br>adrn = adrn + idxn |
| [adrn%] | 011 | minus index | MEM address = <adrn><br>adrn = adrn − idxn |
| [adrn%] | 100 | cyclic increment | MEM address = <adrn><br>adrn = (see below) |
| [adrn%] | 101 | bit-reverse | MEM address = <adrn><br>adrn = (see below) |
| [adrn%] | 110 | table lookup | MEM address = <adrn><br>adrn = (see below) |
| [adrn%] | 111 | small table lookup | MFM address = <adrn><br>adrn = (see below) |

Figure 3B:
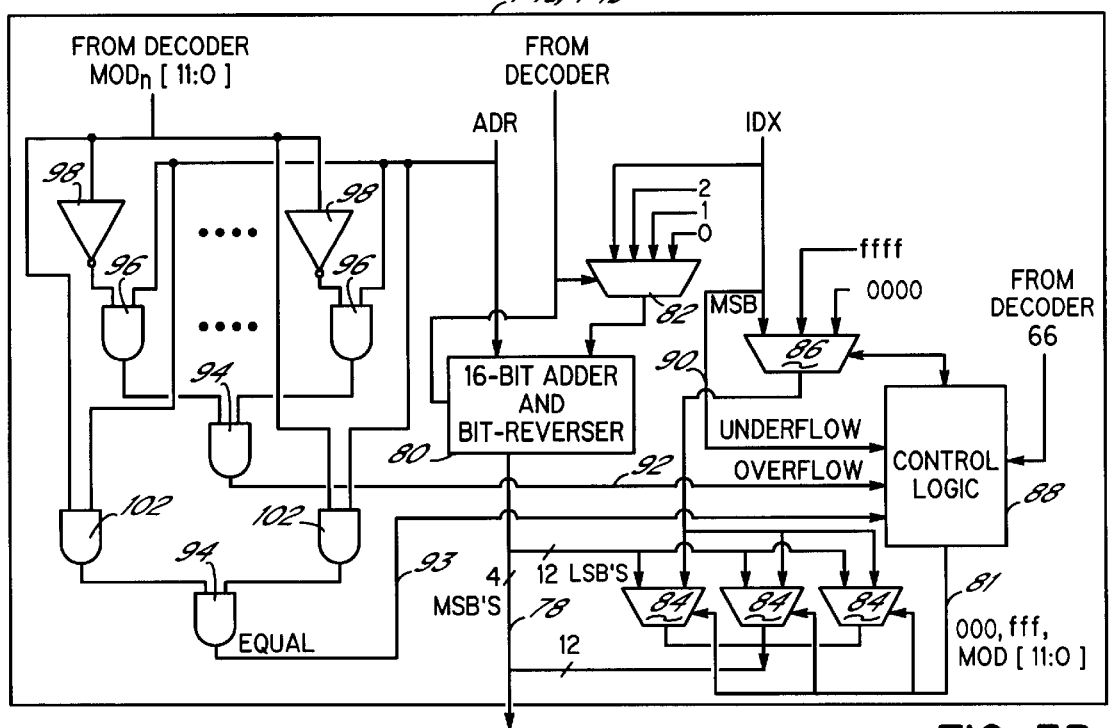
FIG. 3B is a detailed diagram illustrating table lookup logic used by the memory address generator to rapidly generate an address in a table from a base address and index.

Referring now to FIG. 3B, the XALU 74*a* and YALU 74*b* hardware which supports the specific operations performed for the normal and special addressing modes can be described in detail, as well as the specific operations performed in the cyclic increment, bit-reverse, and table lookup special addressing modes.

The inputs to each ALU 74 are an Address value ADR and an Index value IDX. These values are manipulated by various combinational circuitry to support the various normal and special addressing modes, to produce an output value on line 78. Included in this circuitry is a 16-bit adder and bit-reverser 80. The first input to unit 80 is the ADR value received by the ALU 74. The second input to unit 80 is produced by a multiplexer 82. Unit 80, as controlled by decoder 66, generates at its output a binary sum or difference of the binary numbers provided at its two inputs, or alternatively generates a bit-reversal version of the Address value ADR received at its first input, or may directly deliver the value input from multiplexer 82 to its output. In the bit-reversal mode, the carry bits in the twelve LSB's are reversed, so that the carry output of the bit 11 adder is connected to the carry input of the bit 10 adder, the carry output of the bit 10 adder is connected to the carry input of the bit 10 adder, and so on.

Multiplexer 82 generates at its output to unit 80, a sixteen bit value. The value output by multiplexer 82 may be the IDX value received by the ALU 74, or may be the binary number 0, the binary number 1 or the binary number 2.

The twelve least significant bits of the output of unit 80, are connected to the inputs of twelve respective 1-bit multiplexers 84. The second input to each multiplexer 84 is a single bit produced by a multiplexer 86. Multiplexers 84 are controlled by control signals on lines 87 from a control circuit 88. The signals on lines 87 will be either: all zeroes (000 hexadecimal), causing all multiplexers 84 to select the respective signals delivered from unit 80; all ones (fff hexadecimal) causing all multiplexers 84 to select the respective signals delivered from multiplexer 86; or the twelve least significant bits of the contents of a mode register modn 64. The twelve single bit outputs from multiplexers 84 under control of decoder 66, are combined with the four most significant bits produced by unit 80, with the outputs of multiplexers 84 in the same respective positions as the inputs to multiplexers 84 received from unit 80, to produce the 16-bit output of the ALU 74 on lines 78.

Multiplexer 86 selects and produces at its output, one of three 16-bit signals input to multiplexer 86, under the control of a logic circuit 88. The five signals input to multiplexer are: all zeroes (0000 hexadecimal), all ones (ffff hexadecimal), and the index value IDX input to the ALU 74.

Logic circuit 88 controlling multiplexer 86 and multiplexers 84 is responsive to control signals from decoder 66, and to an underflow signal on line 90, an overflow signal on line 92, and an equal signal on line 93.

The underflow signal on line 90 is derived from the most significant bit of the index value IDX input to the ALU 74, and is indicative of an index value which is less than zero and thus as a "1" value sign bit.

The overflow signal on line 92 is derived from a combinational logic circuit comprising a 12-input OR gate 94, twelve two-input AND gates 96 and twelve inverters 98. The inputs of the 12-input OR gate are produced by the twelve 2-input AND gates 96. The respective inputs of the AND gates are the twelve least significant bits of the address value ADR delivered to ALU 74, and the inverses of the respective twelve least significant bits of the contents of a mode register modn 64 delivered by decoder 66. This logical structure will generate a "1" value on line 92 whenever there is a 1 value in any bit position of the address value ADR, and a 0 value in the same bit position of the twelve LSB's of the mode register modn delivered by decoder 66. The use of this function will be explained below.

The equal signal on line 93 is derived from a combinational logic circuit comprising a 12-input OR gate 100 and twelve two-input AND gates 102. The respective inputs of the AND gates are the twelve least significant bits of the address value ADR delivered to ALU 74, and the respective twelve least significant bits of the contents of a mode register modn 64 delivered by decoder 66. This logical structure will generate a "1" value on line 92 only when the twelve LSB's of the address value ADR delivered to ALU 74 are equal to the twelve LSB's of the contents of the mode register modn delivered by decoder 66. The use of this function will be explained below.

In use, the various normal and special addressing modes are implemented as described below.

Post-increment and double-post increment addressing modes are implemented by decoder 66 instructing multiplexer 82 deliver a binary value of 1 or 2, respectively, to unit 80. Decoder 66 instructs unit 80 to add this value to the address value ADR input to ALU 74. Decoder 66 further delivers a value of 000 hexadecimal to the control inputs of multiplexers 84, so that the output of unit 80 is delivered unmodified directly and via multiplexers 84 to output lines 78.

Post-decrement and double-post decrement addressing modes are implemented by decoder 66 instructing multiplexer 82 to deliver a binary value of 1 or 2, respectively, to unit 80. Decoder 66 instructs unit 80 to subtract this value from the address value ADR input to ALU 74. Decoder 66 further delivers a value of 000 hexadecimal to the control inputs of multiplexers 84, so that the output of unit 80 is delivered unmodified directly and via multiplexers 84 to output lines 78.

Plus index and minus index special addressing modes are implemented by decoder 66 instructing multiplexer 82 to deliver the index value IDX received by ALU 74 to unit 80. Decoder 66 instructs unit 80 to add or subtract, respectively, this value from the address value ADR input to ALU 74. Decoder 66 further delivers a value of 000 hexadecimal to the control inputs of multiplexers 84, so that the output of unit 80 is delivered unmodified directly and via multiplexers 84 to output lines 78.

The cyclic increment special addressing mode is used for sequential access to a cyclic buffer of an arbitrary size less than $2^{12}$ or 4096 entries. To use this mode, the beginning address of the cyclic buffer is stored in the index register 62, the twelve least significant bits of the ending address of the cyclic buffer are stored in the twelve least significant bits of the mode register 64. While in the cyclic addressing special mode, the address register 60 stores the next address to be accessed.

To explain this mode, consider accesses to a cyclic buffer of 6 entries, starting at an address of 1234h (where h represents hexadecimal notation), using address, index and mode registers adr2 60c, idx2 62c and mod2 64c. To perform this access, the address registers are initialized with the values adr2=1236h (address of first access), idx2=1234h (beginning address of buffer), mod2=4239h (ending address of buffer, with most significant bits set to 100 to identify the cyclic increment special mode). Then the following sequence of instructions generates the resulting memory addresses and modifications to adr2:

$d4=x[adr2\%] \rightarrow d4=X\text{MEM}[1236h]$; adr2=1237h $d4=x[adr2\%] \rightarrow d4=X\text{MEM}[1237h]$; adr2=1238h $d4=x[adr2\%] \rightarrow d4=X\text{MEM}[1238h]$; adr2=1239h $d4=x[adr2\%] \rightarrow d4=X\text{MEM}[1239h]$; adr2=1234h $d4=x[adr2\%] \rightarrow d4=X\text{MEM}[1234h]$; adr2=1235h To implement this mode, decoder 66 detects signals from program control unit 18 that a special addressing mode is activated, detects the cyclic increment mode from the 100 value of bits 14–12 of the mode register modn identified by the instruction, and delivers the appropriate control signals on lines 68. In response to these control signals, multiplexer 82 delivers a 16-bit binary value of 1 to unit 80. Unit 80 adds this value to the current address value ADR delivered to ALU 74. Also, control logic 88 instructs multiplexer 86 to deliver the index value IDX received by ALU 74 to its output. Control logic 88 also responds to the equal signal on line 93, to deliver control signals of 000 hexadecimal to multiplexers 84 via lines 87, so long as the equal signal on line 93 is not asserted; otherwise, control signals of fff hexadecimal are delivered to multiplexers 84 via lines 87. Thus, so long as the twelve LSB's of the current address, are not equal to the twelve LSB's of the ending address of the table which are in the modn register, the incremented address produced by unit 80 is delivered unchanged directly and via multiplexers 84 to output lines 78 of ALU 74. If, however, the twelve LSB's of the current address equal the twelve LSB's of the ending address of the table, then the end of the table has been reached, and multiplexers 84 replace the twelve LSB's of the incremented address produced by unit 80, with the twelve LSB's of the starting address of the buffer delivered through multiplexer 86, effectively producing an output of the ALU 74 on lines 78 which is equal to the starting address of the buffer.

The bit-reversal special addressing mode is used for special operations such as fast Fourier transforms in which data in an array of up to $2^{12}$ entries is accessed by bit-reversing an address found in an address register adrn 60. The array must begin at an address at a $2^n$ boundary (i.e., an address evenly divisible by $2^n$). Bit reversal access of an array of $2^n$ entries, to generate an FFT of size $2^n$, is performed by storing the value $2^{n-1}$ in the index register 62 and the value 5000 hexadecimal in the mode register 64. To implement this mode, decoder 66 detects signals from program control unit 18 that a special addressing mode is activated, detects the bit-reversal mode from the 101 value of bits 14–12 of the mode register modn identified by the instruction, and delivers the appropriate control signals on lines 68. In response to these control signals, multiplexer 82 delivers the index value IDX received by ALU 74 to unit 80. Unit 80 adds this value to the current address value ADR delivered to ALU 74, in its bit-reversal mode. Control logic 88 causes multiplexer 86 to deliver the value 0000 hexadecimal at its output to multiplexers 84. Also, control logic 88 delivers the twelve LSB's of modn on lines 87 as control signals to multiplexers 84, so that the bit-reversed address produced by unit 80 is delivered unchanged directly and via multiplexers 84 to output lines 78 of ALU 74.

The bit-reversal mode can be used to perform an FFT of different step sizes $2^k$, where k n. To do this, idxn is set to the value k, and the LSB's of modn are set to 1. For example, an FFT of size 8 can be performed starting at address 7f30 hexadecimal, by setting adrn=7f30, modn=5001 hexadecimal and idxn=0008 hexadecimal.

The table lookup special addressing modes are used for accessing a table of values in memory by reference to a base address and an index to the location of a desired value in the table. The table must be of a size $2^n$ and begin at an address at a $2^n$ boundary (i.e., an address evenly divisible by $2^n$). To use normal table lookup in a table of size $2^n$, bits (n−1) to 0 of the mode register modn 64 are set to a value of "1", the four MSB's of the modn register are set to the value 0110, and the remaining bits of the modn register are set to a value of "0". The address register adrn 60 is set to the first address in the table to be accessed and the index register idxn 62 is set to the index of the next entry in the table to be accessed.

To implement the regular table lookup mode, decoder 66 detects signals from program control unit 18 that a special addressing mode is activated, detects the normal table lookup mode from the 110 value of bits 14–12 of the mode register modn identified by the instruction, and delivers the appropriate control signals on lines 68. In response to these control signals, multiplexer 82 delivers the value 0000 hexadecimal to unit 80. Unit 80 adds this value to the current address value ADR delivered to ALU 74, such that the output of unit 80 is equal to the current address value ADR delivered to ALU 74. Control logic 88 causes multiplexer 86 to deliver the index value IDX delivered to ALU 74 to its output and multiplexers 84. Also, control logic 88 delivers the twelve LSB's of modn on lines 87 as control signals to multiplexers 84. This causes those multiplexers 84 receiving a "1" value on lines 87, to select the corresponding bit output from multiplexer 86 in lieu of the corresponding bit output from unit 80. Note that for a table of size $2^n$, the n LSB's of the modn register are set to a "1" value. As a result, the output of the ALU 74 on lines 78 is equal to bits the (n−1) to 0 of the index value IDX delivered to the ALU 74, concatenated to bits 16 to n of the address value ADR delivered to the ALU 74. This produces an output on lines 78 which is equal to the address of the desired location in the table.

The small table lookup special addressing modes is also used for accessing a table of values in memory by reference to a base address and an index to the location of a desired value in the table. The small table lookup mode differs from the regular table lookup mode, in that the small table lookup mode includes features for preventing underflow or overflow of the index beyond the boundaries of the table. In the small table lookup mode, the index, if negative, is forced to zero, and if positive, is forced to the maximum index if greater than the maximum index. As in regular table lookup, the table must be of a size $2^n$ and begin at an address at a $2^n$ boundary (i.e., an address evenly divisible by $2^n$). To use small table lookup in a table of size $2^n$, bits (n−1) to 0 of the mode register modn 64 are set to a value of "1", the four MSB's of the modn register are set to the value 0111, and the remaining bits of the modn register are set to a value of "0". The address register adrn 60 is set to the first address in the table to be accessed and the index register idxn 62 is set to the index of the next entry in the table to be accessed.

To implement the small table lookup mode, decoder 66 detects signals from program control unit 18 that a special addressing mode is activated, detects the small table lookup mode from the 111 value of bits 14–12 of the mode register modn identified by the instruction, and delivers the appropriate control signals on lines 68. In response to these control signals, multiplexer 82 delivers the value 0000 hexadecimal to unit 80. Unit 80 adds this value to the current address value ADR delivered to ALU 74, such that the output of unit 80 is equal to the current address value ADR delivered to ALU 74. Control logic 88 delivers the twelve LSB's of modn on lines 87 as control signals to multiplexers 84. This causes those multiplexers 84 receiving a "1" value on lines 87, to select the corresponding bit output from multiplexer 86 in lieu of the corresponding bit output from unit 80. Note that for a table of size $2^n$, the n LSB's of the modn register are set to a "1" value. As a result, the output of the ALU 74 on lines 78 is equal to bits the (n−1) to 0 of the value delivered from multiplexer 86, concatenated to bits 16 to n of the address value ADR delivered to the ALU 74. This produces an output on lines 78 which is equal to the address of the desired location in the table. If neither the underflow signal on line 90, nor the overflow signal on line 92 are asserted, control logic 88 causes multiplexer 86 to deliver the index value IDX delivered to ALU 74 to its output and multiplexers 84, and the output on lines 78 will be equal to the indexed location in the table. If the underflow signal on line 90 is asserted, then control logic 88 causes multiplexer 86 to deliver a value of 0000 hexadecimal to its output and multiplexers 84, forcing the index to a value of zero, and causing the output on lines 78 to be the address of the first location in the table. (In an underflow condition, the index value IDX received by ALU 74 will have a negative value, as can be determined from a "1" value sign bit, which is the MSB of the index value IDX and forms the underflow signal on line 90.) If there is not an underflow condition, and the overflow signal on line 92 is asserted, then control logic 88 causes multiplexer 86 to deliver a value of ffff hexadecimal to its output and multiplexers 84, forcing the index to its maximum value, and causing the output on lines 78 to be the address of the last location in the table. (In the absence of an overflow condition, bits n to 15 of the index value IDX received by ALU 74 will all have a "0" value. At the same time, bits n−1 to 0 of the mode register modn 64 will have a 1 value, and so the output of OR gate 94, which is the overflow signal on line 92, will be "0". In an overflow condition, one or more of bits n to 15 of the index value IDX received by ALU 74 will have a "1" value; under these conditions, the output of OR gate 94 will be "1", and the overflow signal on line 92 will be "1".)

The immediate post-increment and immediate post-decrement addressing modes cause an immediate value constant encoded into the instruction received by program control unit 18, to be added or subtracted from the current address value. These modes are implemented by decoder 66 recognizing the appropriate mode, and generating control signals causing the contents of the immediate value register of the program control unit to be delivered to the index input IDX of ALU 74. Multiplexer 82 is then controlled to deliver this value to adder 80. Adder 80 is controlled to add or subtract this value from the address value ADR received by ALU 74. At the same time, control logic 88 is caused to deliver control signals of value 000 hexadecimal to multiplexers 84, so that the sum or difference of the address value ADR received from ALU 74 and the immediate increment or decrement value are delivered directly and via multiplexers 84 to output lines 78.

The last addressing mode, immediate indirect, causes a constant address encoded into the instruction received by program control unit 18, to be used as the address. These modes are implemented by decoder 66 recognizing the appropriate mode, and generating control signals causing the contents of the immediate value register of the program control unit to be delivered to the appropriate address lines 29 or 31.

It will be noted that in a circumstance such as that illustrated in FIG. 2B, where the index into a large table 50, is retrieved from another table 52 stored in memory, the index retrieved from table 52 can be directly delivered from the XDATA bus 37 through the IDX input of the ALU 74a/74b, and then via multiplexer 86 to multiplexers 84, for generation of the desired address in table 50 at output lines 78.

Figure 4:
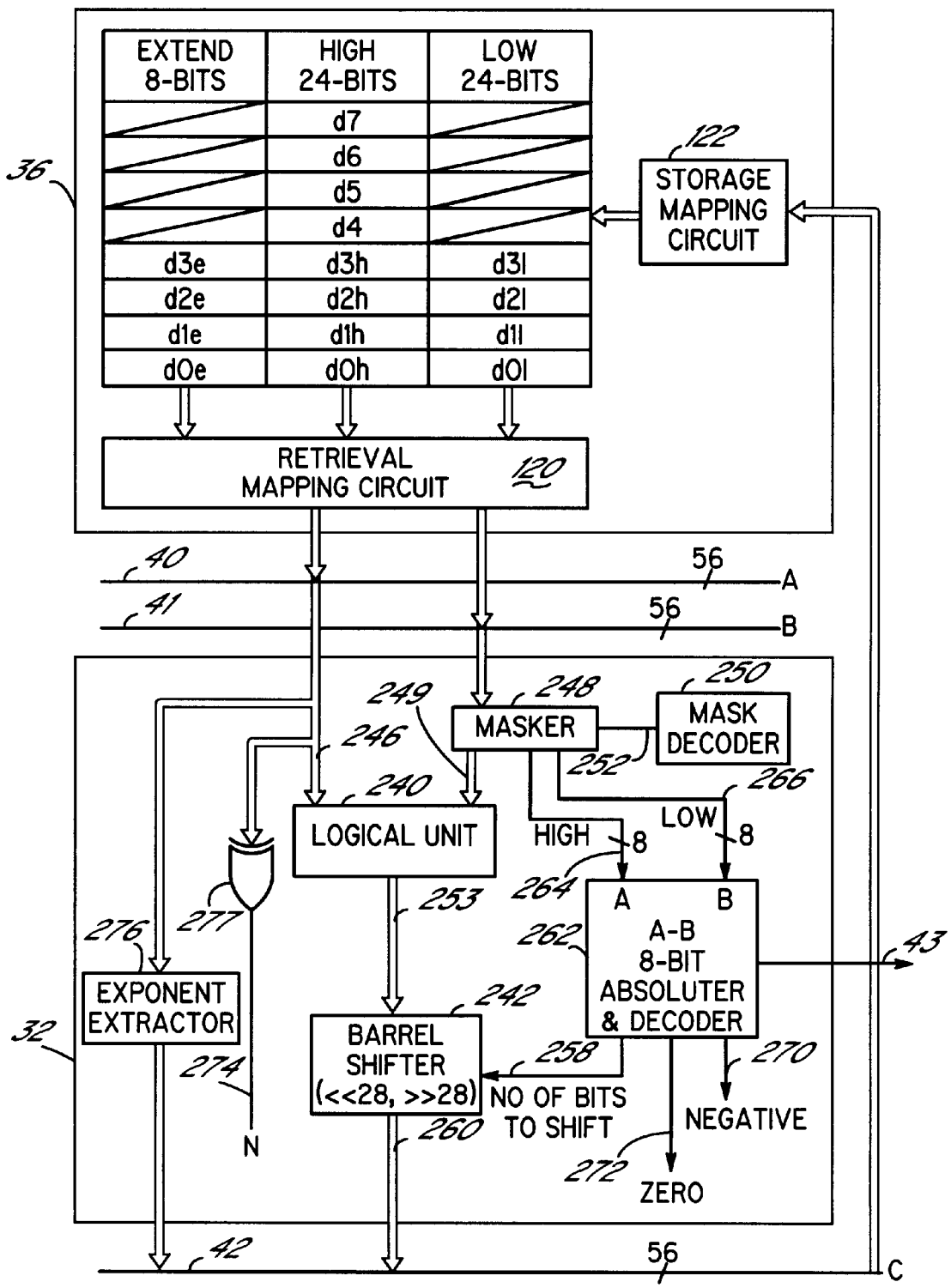
FIG. 4 is a schematic block diagram of the barrel shift and logical unit of FIG. 1, illustrating the interaction of the logical, barrel shifting and short adder portions of this unit with the registers of the register file.

Referring now to FIG. 4, details of the architecture and operation of the barrel shift and logical unit 32 can be more fully explained. As noted earlier, the barrel shift and logical unit 32 includes a logic unit 240 which performs logic tasks such as AND, OR and XOR (exclusive or), as well as a barrel shifter 242 for shifting a digital word a specified number of bits. These elements are used for CRC and bit packing/unpacking operations in the manner described below.

FIG. 4 also illustrates in more detail, the structure of register file 36. The register file includes eight general purpose data registers d0 through d7. Four of the registers, d0 to d3, are 56-bit wide registers, and the remaining registers d4 to d7 are 24-bit wide registers. The wide registers d0 to d3 are separated into three fields: an extend field d0e to d3e, a high field d0h to d3h, and a low field d0l to d3l. The extend field is 8-bits in width and the high and low fields are 24-bits in width. The extend field contains guide bits for overflow, and the low field contains precision bits to reduce rounding errors in multiplication. The core 24-bit data is contained in the high field. The narrow registers d4 to d7 are aligned to the high field of the wide registers, as shown in FIG. 4. In other words, the narrow registers d4 to d7 do not have guide bits and precision bits.

The multiply/add unit 34 and the barrel-shift and logical unit 32 operate on 56-bit data to produce 56-bit results, including an 8-bit overflow extension and 24 precision bits. 56-bit operands are delivered to units 32 and 34 over 56-bit A and B busses 40 and 41. 56-bit results generated by units 32 and 34 are written back to register file 36 over 56-bit C bus 42.

When a 56-bit value is read from one of the short registers d4 to d7, the 24-bit value stored in the register is extended to 56-bits. This function is performed by a retrieval mapping circuit 120. In this operation, the 24-bit data in the narrow register is extended by concatenating 24 less significant precision bits having "0" values, and by concatenating 8 more significant bits. The 8 more significant bits have the same value as the most significant (sign) bit stored in the short register.

When a 56-bit value generated by one of units 32 and 34 is written from the C bus 42 into a short register d4 to d7, the 56-bit value is truncated to 24-bits. This function is performed by a storage mapping circuit 122. In this operation, the more significant 8-bits are truncated and the less significant 24-bits are truncated, and the remaining 24-bits are written into the short register.

These extension and truncation features provide a powerful way to round and clip numbers generated during complex digital signal processing, without requiring the use of additional instruction cycles.

Retrieval mapping circuit 120 and storage mapping circuit 122 also provide additional functions useful in performing cyclic redundancy checking and bit packing/unpacking operations as described below. Specifically, retrieval mapping circuit 120 includes a function for concatenating the high word from one register such as register d0, with the low word of another register such as register d2, and producing the concatenated result as a single 56-bit output onto A bus 40. The use of this functionality in CRC, bit packing and unpacking will be described below. Storage mapping circuit 122 includes an analogous function for separating a 56-bit result from C bus 42, separating the high word of the result (bits 24–27) from the low word of the result (bits 23–0), and storing the high word and low word into separate registers; e.g., the high word of the result may be stored into the high word of register d0, while the low word of the result is stored into the low word of register d2. The use of this functionality will also be described below.

Within barrel-shift and logical unit 32, individual registers or combinations of two registers may be accessed by logic unit 240 via lines 246 and 249 so that logic unit 240 may perform a logical operation upon pairs of registers. Logic unit 240 may further access a masked version of data from registers, produced by a masker circuit 248. Masker circuit 250 utilizes a mask generated by a mask decoder 250 and delivered via bus 252, and forms the bit-wise AND of the mask with data received from the registers, and delivers the result to logical unit 240.

Concatenating barrel shifter 242 is responsive to the output of logic unit 240 on lines 253. Concatenating barrel shifter 242 obtains the 48 less significant bits from logic unit 240, and shifts the 48-bit word a defined number of places to the left or right. The number of places to be shifted are identified by a digital signal on line 258. The maximum number of places that can be shifted is 28 bits to the left or right. The output of concatenating barrel shifter 242 is delivered by lines 260 to C bus 42, allowing this output to be returned to any one of the registers d0 through d7.

Barrel shift and logical unit 32 also includes an 8-bit absoluter and decoder circuit 262. Absoluter and decoder circuit 262 computes the absolute value of the difference between two 8-bit values delivered at its A and B inputs via lines 264 and 266 from masker 248. Circuit 262, produces an output on lines 43, deliverable to the X DATA bus 37 (see FIG. 1) which represents the absolute value of the difference between the binary signal on lines 264 and the binary signal on lines 266. The absoluter in circuit 262 is a simplified 8-bit adder, and relatively rapidly computes this difference, thus providing rapid processing. Circuit 262 also produces a value on lines 258 indicative of a number of bits to be shifted by concatenating barrel shifter 242. This value may be derived from the output of the absoluter, or have other values as determined by control signals from program control unit 18. As discussed below, the combination of absoluter and decoder circuit 262 with concatenating barrel shifter 242 permits relatively complex operations to be performed in single machine cycles. Eight-bit absoluter and decoder circuit 262 also has an output on line 270 which indicates whether the digital signal on lines 266 received at input B of circuit 262 is greater than the digital signal received on lines 264 at input A of circuit 262. This signal is referred to as the "NEGATIVE" signal. Finally, circuit 262 produces an output on line 272 which indicates when the digital signal on lines 266 received at input B of added 262 is equal to the digital signal received on lines 264 at input A of circuit 262. This signal is referred to as the "ZERO" signal.

In addition to the foregoing, barrel shifter and logical unit 32 also comprises a 2-input XOR gate 277. A first input of XOR gate is connected to the most significant bit of the high word of the signal on bus 246 (i.e., to bit 47), and the second input of XOR gate 277 is connected to the most significant bit of the low word of the signal on bus 246 (i.e., bit 23). The output of XOR gate 277 is a 1-bit digital value on line 274 which will be referred to as "N", for reasons discussed below.

Barrel-shifter and logical unit 32 also includes an exponent extractor 276, which calculates the number of redundant sign bits in the value it receives, to facilitate normalization of register contents using exponential notation.

Figure 5A:
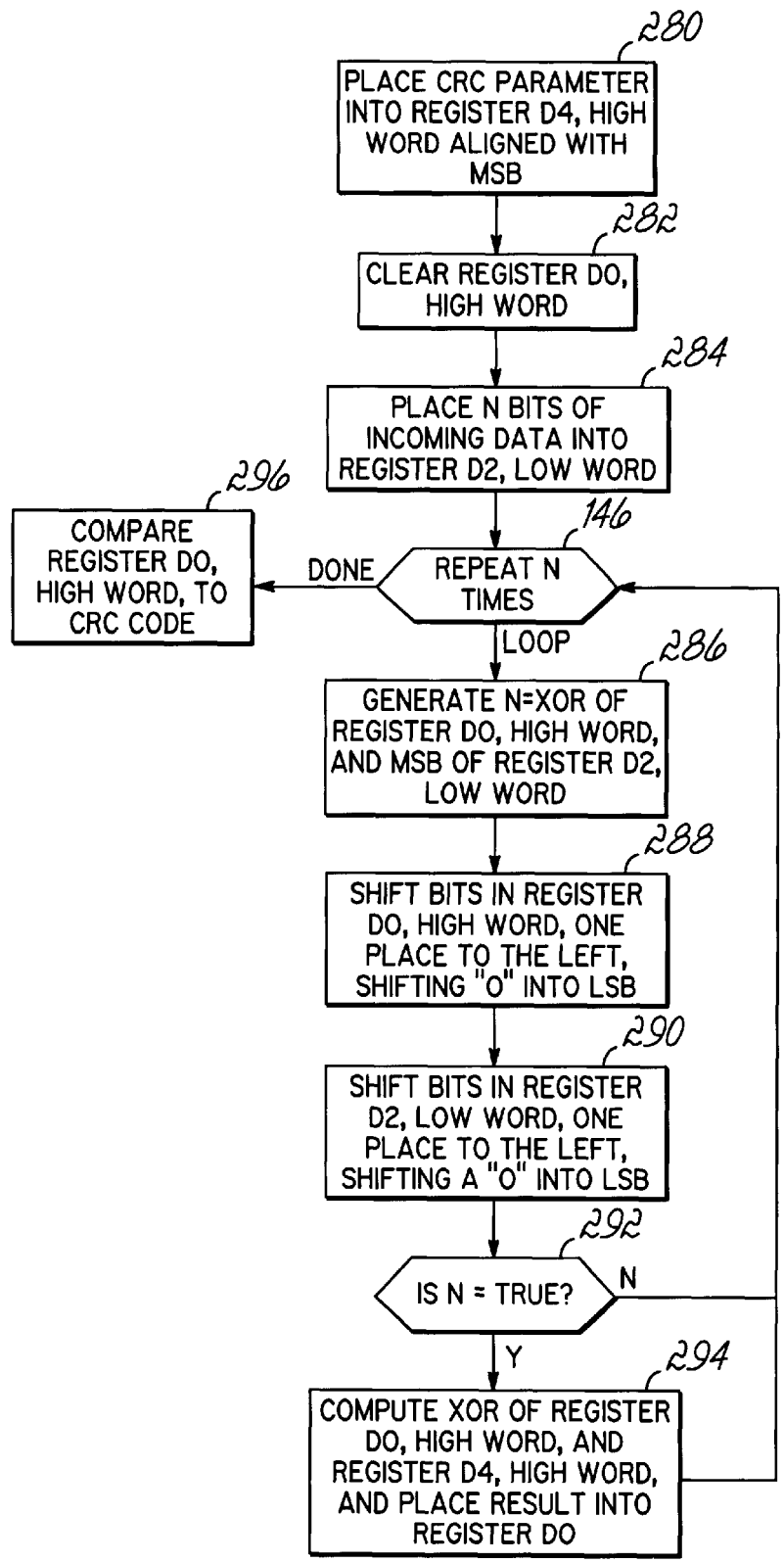
FIG. 5A is a flow chart of operations performed as part of a cyclic redundancy check (CRC) on an incoming stream of digital data.

Referring now to FIG. 5A, an operation for performing a cyclic redundancy check on incoming digital data can be explained. A cyclic redundancy check typically involves performing a sequence of XOR (exclusive or) operations on words of incoming data, and ultimately comparing the results to a cyclic redundancy code appended to that data. Cyclic redundancy checks require the use of a cyclic redundancy parameter and cyclic redundancy code. One manner in which a cyclic redundancy check may be performed by the processor shown in FIG. 4, is described in FIG. 5A.

The procedure of FIG. 5A begins at step 280 by placing a CRC parameter, which may be 8, 12, 16, 18, 20 or 24 bits in length, for different applications, into register D4, high word, aligned with the MSB. Next in step 282, the high order word of register d0 is cleared, so that the CRC code for the data can be generated in the high word of register d0. Next, n bits of incoming data to be redundancy checked are placed into the low word of register d2 (step 284).

After these initializing steps, the cyclic redundancy check is performed on the n bits of incoming data stored in register d2 by repeating the following steps n times. In step 286, a value N is generated by performing an exclusive OR of the most significant bit of the high word of register D0, with the most significant bit of the low word of register d2. Next, the bits in the high word of register d0 are shifted one place to the left and a value of zero is inserted into the least significant bit of the high word of register d0 (step 288). Next, in step 290, the bits in low word of register d2 are shifted one place to the left and a zero is placed in the least significant bit of the low word of register d2. Next, in step 292, the value N generated in step 286 is used to determine whether to include step 294 or return directly to step 286. If the value N is true, an exclusive OR is formed from the high word of register d0, with the high word of register D4 (the CRC parameter). The result of this exclusive OR is then placed in register d0 and the process returns to step 286.

After n repetitions of the loop including steps 286, 288, 290, 292 and 294, the CRC value for the n-bits of incoming data stored in step 284, resides in register d0, high word. Accordingly, the value in register d0, high word can be compared to the received CRC value to determine if there have been any errors (step 296).

The foregoing process, if carried out in conventional digital signal processing circuitry, would involve a large number of machine cycles because of the need to perform multiple bit shift, mask and other logical operations in a sequential order. In accordance with the principles of the present invention, however, all of the critical steps 286, 288, 290, 292 and 294 can be performed in two machine cycles, by taking advantage of the specific architecture illustrated in FIG. 4.

Figure 5B:
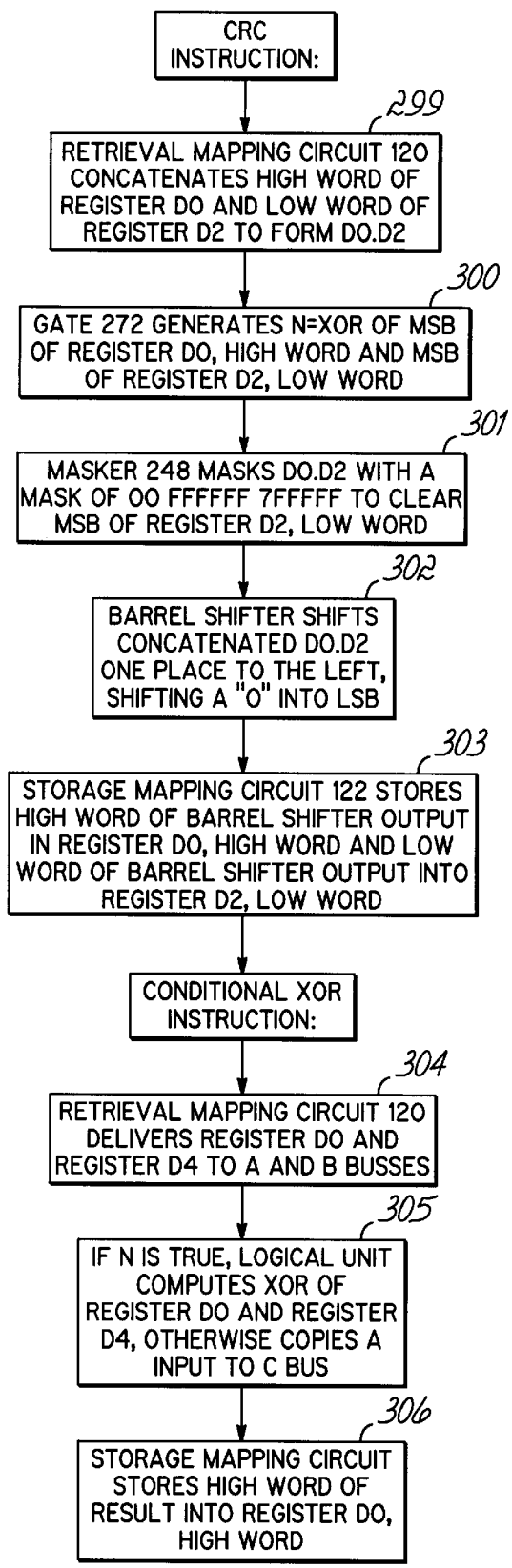
FIG. 5B is a flow chart describing the implementation of a key portion of the operations of FIG. 5A through the execution of two instructions by the barrel shift and logical unit shown in FIG. 4.

Specifically, referring to FIG. 5B, the architecture of FIG. 4 provides a "crc" instruction which performs all of steps 286, 288 and 290. In the "crc" instruction, retrieval mapping circuit 120 concatenates 299 the high word of register d0 and low word of register d2 together, with register d0 in the more-significant position, and delivers the result to barrel-shifter and logical unit 32. XOR gate 277 operates on the delivered concatenated word, and generates the exclusive OR of the most significant bit of the high word of register d0, and the most significant bit of low word of register d2 (step 300). At the same time, during execution of the "crc" instruction, masker 248 masks the concatenated contents of registers d2 and d0 with the output of mask decoder 250, which has the 56 bit value of 00ffffff7fffff hexadecimal, i.e., a 56 bit value in which all but the most significant bit of the lower order word has a "1" value (step 301). This masking operation clears the most significant bit of the low order word of register d2 for further processing. Then, still as part of the "crc" instruction, barrel shifter 242 shifts the output of logic unit 240 on lines 253 one place to the left, thus shifting a zero value into the least significant bit of the contents of register d0 and d2 (step 302). Finally, to conclude the execution of the "crc" instruction, the output of concatenating barrel shifter 242, output on lines 260, is stored into registers d0 and d2. Specifically, the high word output from the barrel shifter is stored into the high word of register d0 and the low word output from the barrel shifter is stored into the low word of register d2 (step 303).

As a result of these steps performed by XOR gate 277, masker 248, logic unit 240 and concatenating barrel shifter 242 for the "crc" instruction, the operations identified in steps 286, 288 and 290 of FIG. 5A have been completed. As a result, the operations of steps 292 and 294 identified in FIG. 5A may be completed by a "conditional XOR" instruction. The conditional XOR instruction causes the retrieval mapping circuit 120 to deliver register d0 and register d4 to the A and B busses 40 and 41 (step 304). Then, logical unit 240 tests the value of N on line 274 and if N is "1", logical unit 240 computes and outputs the XOR of the contents of register d0 and the contents of register d4 (step 305). If N is "0", then the contents of register d0 are output by logic unit 240 unchanged. Finally, in step 306, storage mapping circuit 122 stores the high word of the result into register d0.

Figure 6A:
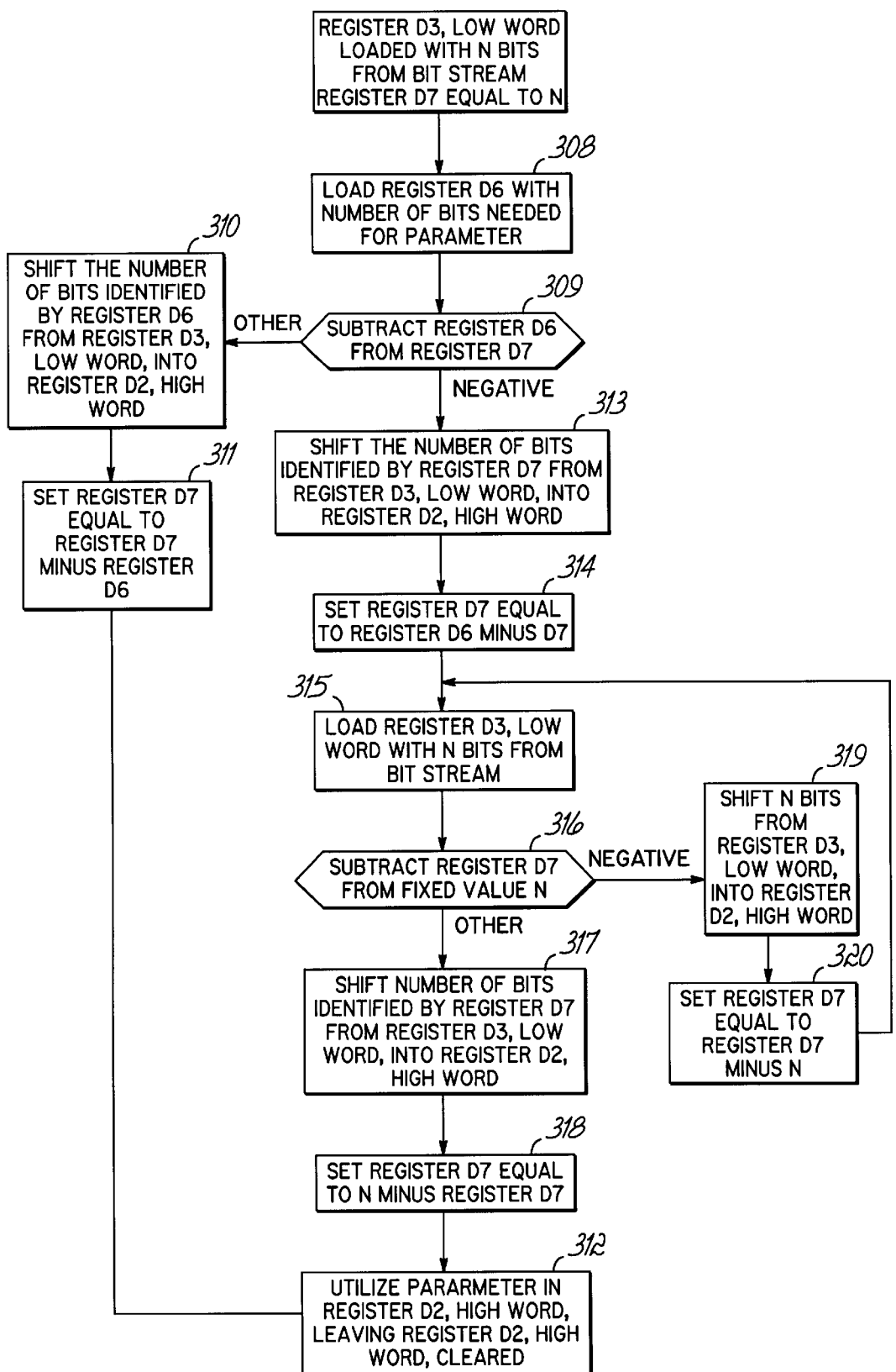
FIG. 6A is a flow chart of operations performed as part of a bit unpacking operation on an incoming stream of digital data.

Referring now to FIG. 6A, another operation which is typically performed in digital signal processors can be explained. This operation involves unpacking bits received in a digital bit stream. In many encoding schemes, parameters in a digital bit stream are packed together, and information is used to indicate how the bits should be unpacked into parameters. Accordingly, to unpack such a bit stream, it is necessary to load a desired, variable number of bits from the bit stream into a register and then decode these bits.

An example of an unpacking process of this kind begins with a register, which for present purposes will be register d3, low word, loaded with N bits received from the bit-stream. Also, another register, which for present purposes will be register d7, storing the number N, i.e., storing the number of bits available in register d3. In a first step 308, the number of bits needed for the first parameter are loaded into a register, which for present purposes will be register d6.

To begin processing, in step 309, the number of bits needed for the first parameter, as identified by register d6, is subtracted from the number of bits available, as identified by register d7.

If the result is zero or positive, then there are sufficient bits for the parameter available in register d7. Accordingly, in step 310, the desired number of bits for the first parameter, as identified in register d6, are shifted from the low word of register d3 to the left and into the high word of register d2, and then in step 311, the number of bits previously shifted from register d3 and into register d2, as identified in register d6, is subtracted from register d7, so that register d7 accurately reflects the number of bits from the bit stream remaining in the low word of register d3. Next, in step 312, the parameter in register d2 is processed, leaving register d2, high word, cleared. Processing can then return to step 308 to load into register d6, the number of bits needed for the next parameter.

If the number of bits available in step 309, is less than the number of bits needed for the current parameter, then the result of subtracting register d6 from register d7 will be negative. In this case, in step 313, the number of bits in the low word of register d3, as identified in register d7, are shifted from the low word of register d3 to the left and into the high word of register d2. Then, in step 314, the number of bits previously shifted from register d3 and into register d2, as identified in register d7, is subtracted from register d6, and the result is stored in register d7, so that register d7 reflects the number of bits still needed to complete the current parameter. In step 315, register d3, low word, is loaded with N more bits from the bit stream being packed, so that more bits are available to complete the current parameter. Then, in step 316, the number of bits needed to complete the parameter, as identified by register d7, is subtracted from N, the number of bits then available in register d3, low word, to determine whether a sufficient number of bits are available in register d3, low word, to complete the parameter.

If in step 316, a sufficient number of bits are available in register d3 to complete the parameter, the result of the subtraction in step 316 will be zero or positive, and the procedure proceeds to step 317 to shift the desired number of bits to complete the parameter, as identified by register d7, from register d3, low word, into register d2, high word. Then, the value in register d7 is subtracted from N, to product the number of bits remaining for further parameters in register d3, and the result is stored in register d7. Thereafter, the parameter in register d2 is used, leaving register d2 cleared (step 312), and processing returns to step 308 for the next parameter.

Alternatively, if in step 316 there is an insufficient number of bits in register d3, low word, to complete the parameter, the result of the subtraction in step 316 is a negative number. In this case, the process proceeds from step 316 to step 319, in which all N bits are shifted out of register d3, low word, and into register d2, high word. Next, in step 320, the number N is subtracted from register d7, and the result is stored in register d7, so that d7 includes the number of additional bits required to complete the parameter that has been partially shifted into register d2. After step 320, the procedure returns to step 315, in which a new N-bit word from the bit stream is loaded into register d3, low word for subsequent shifting of the remaining bits needed from register d3 into register d2.

The foregoing procedure, if performed in a conventional signal processor, would involve a sizable number of instruction cycles. Specifically, in a typical architecture in which the arithmetic logic unit is separate from the barrel shifting unit, it may take twelve machine cycles for the digital signal processor to first determine that a sufficient number of bits are available for the next parameter, then shift the desired number of bits from one register to another, and then update a counter indicating the number of bits remaining for future parameters. In accordance with the principles of the present invention, these various operations can be performed in one "extract" or "extract residue" instruction.

Figure 6B:
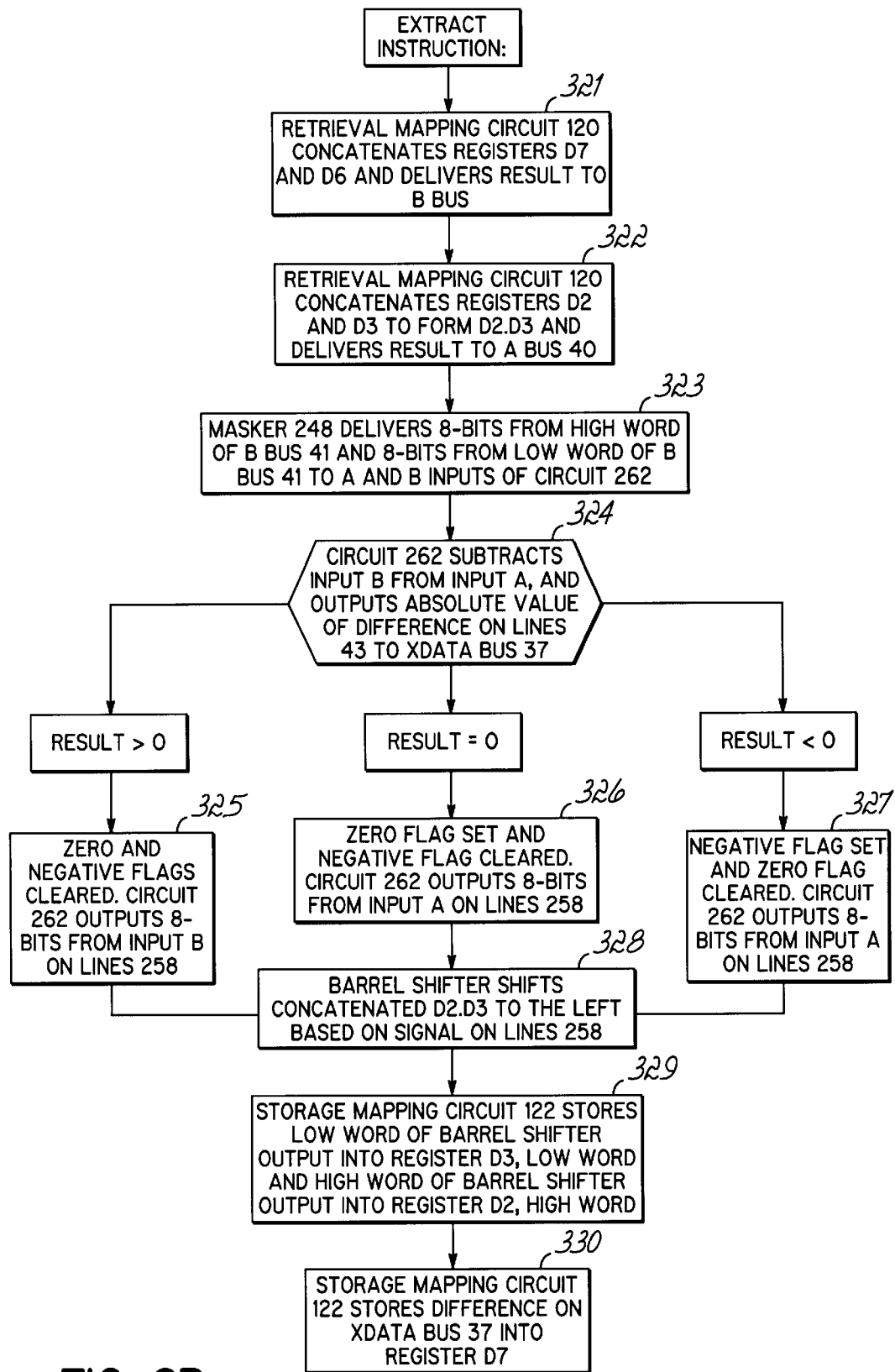
FIGS. 6B and 6C are flow charts describing the implementation of a key portion of the operations of FIG. 6A through the execution of two instructions by the barrel shift and logical unit shown in FIG. 4.
Figure 6C:
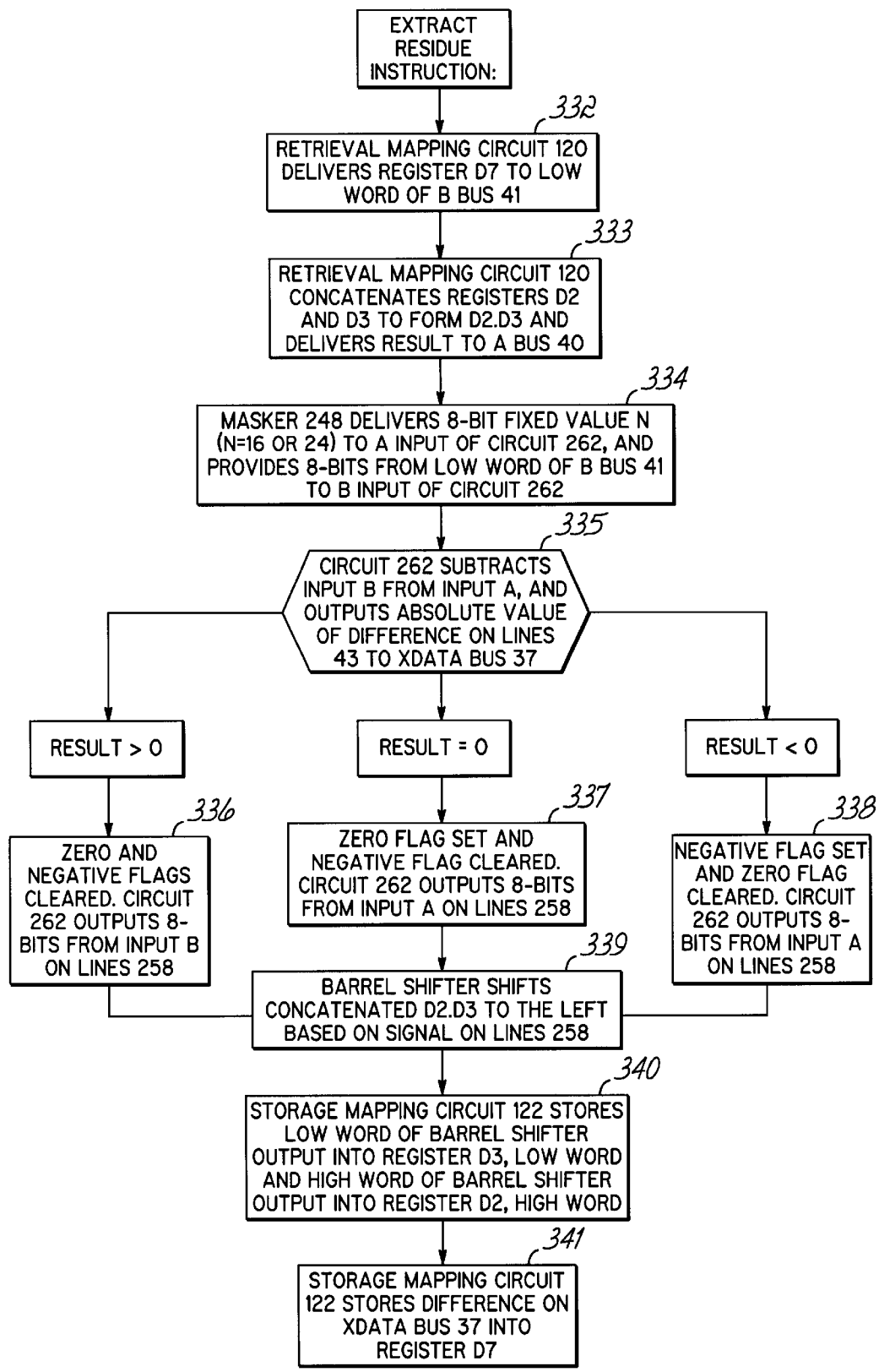

Specifically, referring to FIGS. 6B and 6C, respectively, an "extract" instruction and an "extract residue" instruction supported by the logic and barrel shift unit 32 can be used together to achieve all of the functions identified in steps 309, 310, 311, 313, 314, 316, 317, 318, 319 and 320 of FIG. 6A. The remaining steps of FIG. 6A, merely involve loading the number of bits for a parameter (step 308), loading bits to be unpacked (step 315), and processing a parameter after unpacking (step 312), as well as conditional branching steps for determining, based on the comparisons performed by the "extract" and "extract residue" instructions, which of these operations to perform.

The "extract" instruction performs all of the operations of steps 309, 310, 311, 313 and 314 of FIG. 6A. In decoding the "extract" instruction 320, first, retrieval mapping circuit 120 concatenates registers d7 and d6 with register d6 in the low word, and delivers the result to the B bus 41 (step 321). At the same time, retrieval mapping circuit 120 concatenates register d2, high word, to register d3, low word, and delivers the result to A bus 40 (step 322). Masker 248 then delivers 8-bits from the high word of B bus 41, and 8-bits of the low word of B bus 41, to the A and B inputs of absoluter and decoder circuit 262 (step 323). Circuit 262 then subtracts input B from input A, effectively subtracting the needed number of bits identified by register d6 from the number of bits available identified by register d7 (step 324). Circuit 262 includes circuitry for producing different outputs on lines 258, 270 and 272, based on whether the values received from input A (register d7) is greater than or less than the value received from input B (register d6).

Specifically, if the result of subtracting register d6 from register d7 produces a number which is less than or equal to zero, circuit 262 produces an output on lines 258 which is equal to input A, i.e., equal to the number of bits remaining in register d3 as identified by register d7 (steps 326 or 327). If the result is negative, circuit 262 sets the "NEGATIVE" flag on line 270 (step 327) to indicate that an insufficient number of bits were available to complete the next parameter. If the result is zero, circuit 262 sets the "ZERO" flag on line 272 (step 326) to indicate that a just sufficient number of bits were available to complete the next parameter.

Alternatively, if the difference between the needed number of bits identified by input B (register d6) and the available number of bits identified by input A (register d7) is greater than zero (step 325), circuit 262 outputs on lines 258, the value input to circuit 262 on input B, i.e., outputs the needed number of bits (register d6) on lines 258. At the same time, circuit 262 clears the "NEGATIVE" and "ZERO" flags on lines 270 and 272.

In each of these cases (steps 325, 326 or 327), the absolute value of the difference between input A and input B, is output by circuit 262 on lines 43, for later storage via XDATA bus 37 into register d7.

Once circuit 262 has completed these operations, circuit 262 has produced on lines 258 an indication of an appropriate number bits to shift for the current circumstances. Accordingly, in step 328, the barrel shifter 242 shifts bits received from the A bus 40, from register d3, low word, into register d2, high word. The number of bits shifted by barrel shifter 242 is equal to the number of bits identified on lines 258 produced by circuit 262. In step 329, the result of the concatenated shift performed by barrel shifter 242 is then stored back into the high words of registers d2 and d3 by storage mapping circuit 122. At the same time, in step 330 storage mapping circuit 122 stores the absolute value of the difference computed by circuit 262 and delivered to XDATA bus 37, into register d7, to complete the operations performed by the "extract" instruction.

The "extract residue" instruction performs all of the operations of steps 316, 317, 318, 319 and 320 of FIG. 6A. In decoding the "extract residue" instruction, first, retrieval mapping circuit 120 delivers register d7 to the low word of the B bus 41 (step 332). At the same time, retrieval mapping circuit 120 concatenates register d2, high word, to register d3, low word, and delivers the result to A bus 40 (step 333). Masker 248 then delivers the 8-bits from register d7 on the low word of the B bus 41, to the B input of absoluter and decoder circuit 262, and at the same time, supplies a fixed value equal to the number of bits in each block loaded into register d3 (which may be programmed to be 16 or 24), from input A, to the A input of absoluter and decoder circuit 262 (step 334). Then, circuit 262 subtracts input B from input A, effectively subtracting the number of bits needed to complete the parameter identified by register d7, from the number N of bits available in register d3 (step 335). Circuit 262 includes circuitry for producing different outputs on lines 258, 270 and 272, based on whether the values received from input A (register d7) is greater than or less than the fixed value.

Specifically, if the result of subtracting register d7 from the fixed value is a number which is less than or equal to zero, circuit 262 produces an output on lines 258 which is equal to input A, i.e., equal to the number N of bits available (step 337 or 338). At the same time, if the result is negative, circuit 262 sets the "NEGATIVE" flag on line 270 (step 338) to indicate that more bits need to be shifted to complete the parameter. If the result is zero, circuit 262 sets the "ZERO" flag on line 272 (step 337) to indicate that no more bits need to be shifted to complete the parameter.

Alternatively, if the difference between the needed number of bits identified by input B (register d7) and the available number of bits identified by input A (the fixed value N) is greater than zero (step 336), circuit 262 outputs on lines 258, the 8-bit value received at input B, i.e., the needed number of bits from register d7. At the same time, circuit 262 clears the "NEGATIVE" and "ZERO" flags on lines 270 and 272.

In any of the above cases (steps 336, 337 or 338), the absolute value of the difference between inputs A and B, is delivered on lines 268, for later storage via XDATA bus 42 into register d7. If the negative flag is not set, d7 will then identify the number of bits remaining in register d3 for further parameters. If the negative flag is not set, d7 will then identify the number of additional bits that must be shifted to complete the parameter.

Once circuit 262 has completed these operations, circuit 262 has produced on lines 258 an indication of an appropriate number bits to shift for the current circumstances. Accordingly, in step 339, the barrel shifter 242 shifts bits received from the A bus 40, from register d3, low word into register d2, high word. The number of bits shifted by barrel shifter 242 is equal to the number of bits identified on lines 258 produced by circuit 262. In step 340, the result of the concatenated shift performed by barrel shifter 242 is then stored back into the high word of register d2 and low word of register d3 by storage mapping circuit 122. At the same time, in step 341 storage mapping circuit 122 storage the absolute value of the difference computed by circuit 262 and delivered to XDATA bus 37, into into register d7, to complete the operations performed by the "extract residue" instruction.

As a result of the foregoing operations performed by a single "extract" or "extract residue" instruction in accordance with the principles of the present invention, all of the necessary processing for completing steps 309, 310, 311, 313, 314, 316, 317, 318, 319 and 320 of the bit unpacking process of FIG. 6A can be completed by "extract" and "extract residue" instructions.

Specifically, to perform an unpacking operation, register d3 is loaded with N bits from the bit stream, register d7 is set equal to N, and register d6 is loaded with the desired number of bits for the first parameter. To load the first parameter into register d2, a single extract instruction is executed. After the extract instruction, if the NEGATIVE flag is not set, then the parameter in register d2 is complete, and may be used. In this case, after the parameter in register d2 has been used and register d2 cleared, register d6 may be loaded with the desired number of bits for the next parameter, and the extract instruction executed again.

Whenever an extract instruction is executed, the parameter in register d2 will be complete, unless the NEGATIVE flag is set. Thus, the process described in the preceding paragraph can be repeated until all of the parameters have been extracted or the NEGATIVE flag is set after executing an extract instruction. When the NEGATIVE flag is set after executing an extract instruction, then a loop is performed; in each pass register d3 is loaded with n additional bits from the bit stream, and an extract residue instruction is executed. This loop is repeated until the NEGATIVE flag is set, to complete the needed parameter.

Thus, all of the operations needed to extract a desired number of bits from the bit stream, obtain further bits from the bit stream and keep track of the number bits available can be performed by the "extract" and "extract residue" instructions. This represents a substantial reduction of the sizable number of instructions which would be ordinarily be needed to implement the procedure of FIG. 6A, and provides for a substantial speed increase of processing by the digital signal processor in accordance with the principles of the present invention.

It will be noted that, in the above discussion of the extract and extract residue instructions, the masker 248 and logical unit 240 are not used for functional manipulation of the concatenated contents of registers d2 and d3. The masker 248 and logical unit 240 can, however, be used for sign extension of parameters shifted into register d2. To achieve this, masker 248 includes a function for determining whether MSB of the low word received from A bus 40 has a "1" or "0" value. This bit will be the sign bit of the parameter to be shifted from register d3 into register d2. When sign-extension is enabled, masker 248 produces a 56-bit output to logical unit 240 on lines 249, having the value of ffffffff 000000 hexadecimal when the MSB of the low word received from A bus 40 has a 1 value, indicating a negative parameter, or having the value of 00000000 000000 hexadecimal, when the MSB of the low word received from the A bus 40 has a 0 value. When sign-extension is enabled, logical unit 40 forms the OR of the output of masker 248 with the 56-bit value received from A bus 40. This causes the sign bit of the parameter shifted out of register d3 into register d2, to be extended throughout the upper portion of register d3.

It will also be noted that the extract and extract residue instructions can be used for bit packing operations as well as bit unpacking operations, by providing an programmable shift direction in the extract instruction.

As one example, to pack 6, 12 and 5 bit parameters into a bit stream, by extracting these parameters from 16-bit fixed-length words, the following steps can be taken. First, put the first 16-bit fixed length word into register d3. Next, store the number of vacant bits in d3, to be removed by packing, into register d6. Then store into register d7, the value 12, which is the length of the second parameter to be packed. Then put the second 16-bit fixed length word into register d4. Then use the extract instruction to shift from d4, the number of bits identified in d7, to the right into register d2. Then use the extract instruction to shift from register d2 to the left and into register d3, the number of bits identified in d7, while comparing the number of bits identified in d7 to the number of vacant bits identified in register d6.

If neither of the NEGATIVE or ZERO flags are set when shifting from register d2 into register d3, then there is room remaining in register d3 for the next parameter. In this case, store into register d7, the value 5, which is the length of the third parameter to be packed. Then put the third 16-bit fixed length word into register d4. Then use the extract instruction to shift from d4, the number of bits identified in d7, to the right into register d2. Then use the extract instruction to shift from register d2 to the left into register d3, the number of bits identified in d7, while comparing the number of bits identified in d7 to the number of vacant bits identified in register d6.

If during the step of shifting from register d2 into register d3, either the NEGATIVE or ZERO flags are set, then register d3 is full. In this case, the contents of d3, which are 24 packed bits of the bit stream, are output to memory. Then the extract residue instruction is repeatedly executed, as described above, to shift the remaining bits from register d2 into register d3. When either the NEGATIVE or ZERO flags are set as part of executing an extract residue instruction, then return to refill register d2 with further bits as described above.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A digital signal processor, comprising a program control unit fetching a plurality of instructions forming a program for said digital signal processor, and decoding said instructions to generate command signals controlling operations of other units of said digital signal processor;

a digital data bus connected to a digital data memory storing digital signals to be manipulated by said digital signal processor, a register file storing digital signals;

an address generator unit connected to said digital data bus, said register file and to said program control unit by responding to said command signals to retrieve and store digital signals from and to said digital data memory to and from said register file via said digital data bus;

a shift/logical unit connected to said program control unit and to said register file and responding to said command signals to perform digital signal processing upon digital signals in said register file, said shift/logical unit comprising: a short adder for computing the absolute value of a difference between the binary value of digital signals stored in a first register of said register file and the binary value of digital signals stored in a second register of said register file, and a shifter shifting digital signals stored in a third register of said register file into a fourth register of said register file, said shifter being connected to said short adder for shifting a number of bits identified by an output of said short adder.

2. The digital signal processor of claim 1 wherein said program control unit is responsive to an unpacking instruction to perform part of a variable length code unpacking operation by generating command signals to said register file, address generator unit and shift/logical unit, wherein in response to said unpacking instruction, said short adder computes the absolute value of the difference between the binary value of digital signals stored in said first register and the binary value of digital signals stored in said second register, and when the binary value of digital signals stored in said first register is less than or equal to the binary value of digital signals stored in said second register, said short adder stores the absolute value of the difference in said second register, and outputs the digital signals stored in said first register to said shifter, or when the binary value of digital signals stored in said first register is greater than the binary value of digital signals stored in said second register, said short adder stores the absolute value of the difference in said first register, and outputs the digital signals stored in said second register to said shifter; and concurrently said shifter shifts a number of digital signals stored in said third register into said fourth register, said number being equal to the value output from said short adder.

3. The digital signal processor of claim 2 wherein in further response to said unpacking instruction when the binary value of digital signals stored in said first register is less than or equal to the binary value of digital signals stored in said second register, said address generator unit retrieves digital signals from said digital data memory via said data bus, and stores said digital signals in said third register, and new digital signals are stored in said first register, said new digital signals having a value indicative of the number of digital signals retrieved from memory and stored in said third register.

4. The digital signal processor of claim 1 wherein said shifter of said shift/logical shifts said digital signals to more significant positions.

5. The digital signal processor of claim 1 wherein said shifter of said shift/logical shifts said digital signals to less significant positions.

* * * * *

UNITED STATES PATENT AND TRADEMARK OFFICE
CERTIFICATE OF CORRECTION

PATENT NO. : 6,263,420 B1
DATED : July 17, 2001
INVENTOR(S) : Tan et al.

It is certified that error appears in the above-identified patent and that said Letters Patent is hereby corrected as shown below:

Column 2,
Line 34, reads "OF THE DRAWING" and should read -- OF THE DRAWINGS --.

Column 6,
Line 6, reads "the address stored in" and should read -- the addresses stored in --.

Columns 6, 7, 8, 9, 10 and 11,
All "adrn, idxn, and modn" the 'n' should be italicized.

Column 10,
Line 14, reads "where k n" and should read -- where k≠n --.

Column 14,
Lines 32 and 53, read "D4" and should read -- d4 --.
Line 42, reads "D0" and should read -- d0 --.

Column 16,
Line 42, reads "product the number" and should read -- produce the number --.

Column 17,
Line 33, reads "values received" and should read -- value received --.

Column 18,
Line 24, reads "values received" and should read -- value received --.
Line 63, reads "circuit 122 storage the" and should read -- circuit 122 stores the --.
Line 65, reads "into into" and should read -- into --.

Column 19,
Line 35, reads "would be ordinarily be needed" and should read -- would ordinarily be needed --.
Line 64, reads "by providing an" and should read -- by providing a --.

Column 20,
Line 46, reads "reads "applicant's" and should read -- applicants' --.

UNITED STATES PATENT AND TRADEMARK OFFICE
CERTIFICATE OF CORRECTION

PATENT NO. : 6,263,420 B1
DATED : July 17, 2001
INVENTOR(S) : Tan et al.

It is certified that error appears in the above-identified patent and that said Letters Patent is hereby corrected as shown below:

<u>Column 22,</u>
Lines 23 and 26, read "shift/logical shifts" and should read -- shift/logical unit shifts --.

Signed and Sealed this

Fourth Day of June, 2002

Attest:

Attesting Officer

JAMES E. ROGAN
*Director of the United States Patent and Trademark Office*